US010328768B2

(12) United States Patent
Iyer et al.

(10) Patent No.: US 10,328,768 B2
(45) Date of Patent: Jun. 25, 2019

(54) TEMPERATURE DOOR FOR HVAC TO FACILITATE BLENDING

(71) Applicant: Hanon Systems, Daejeon (KR)

(72) Inventors: Jayanthi R. Iyer, Northville, MI (US); Jim Nolta, Canton, MI (US); Eric K. Haupt, Livonia, MI (US)

(73) Assignee: HANON SYSTEMS, Daejeon (KR)

( * ) Notice: Subject to any disclaimer, the term of this patent is extended or adjusted under 35 U.S.C. 154(b) by 489 days.

(21) Appl. No.: 15/008,587

(22) Filed: Jan. 28, 2016

(65) Prior Publication Data

US 2017/0217282 A1  Aug. 3, 2017

(51) Int. Cl.
*B60H 1/00* (2006.01)

(52) U.S. Cl.
CPC ..... *B60H 1/00671* (2013.01); *B60H 1/00035* (2013.01); *B60H 2001/00714* (2013.01)

(58) Field of Classification Search
CPC ............ B60H 1/00671; B60H 1/00035; B60H 2001/00714
USPC ........................................ 454/152, 158, 160
See application file for complete search history.

(56) References Cited

U.S. PATENT DOCUMENTS

| | | | |
|---|---|---|---|
| 6,231,437 B1 | 5/2001 | Loup et al. | |
| 6,668,909 B2 * | 12/2003 | Vincent | B60H 1/0005 165/203 |
| 6,758,260 B2 * | 7/2004 | Clifford | B60H 1/00678 165/103 |
| 7,520,804 B2 * | 4/2009 | Venkatappa | B60H 1/00685 454/139 |
| 7,575,511 B2 | 8/2009 | Haupt et al. | |
| 8,425,284 B2 * | 4/2013 | MacDonald | B60H 1/00028 454/139 |
| 2014/0004784 A1 * | 1/2014 | Nolta, Jr. | F24F 7/00 454/195 |
| 2015/0259212 A1 * | 9/2015 | Li | B82Y 40/00 428/221 |

FOREIGN PATENT DOCUMENTS

| | | |
|---|---|---|
| EP | 1481828 A1 | 12/2004 |
| JP | 2006168432 A | 6/2006 |
| JP | 4434395 B2 | 3/2010 |
| KR | 20070057542 A | 6/2007 |
| KR | 20100020798 A | 2/2010 |
| KR | 20100065878 A | 6/2010 |

* cited by examiner

*Primary Examiner* — Gregory L Huson
*Assistant Examiner* — Dana K Tighe
(74) *Attorney, Agent, or Firm* — Shumaker, Loop & Kendrick, LLP

(57) ABSTRACT

A temperature door for an air handling system of a heating, ventilating, and air conditioning system for a vehicle includes a first sealing surface and a second sealing surface spaced apart from the first sealing surface. A third surface extends between the first sealing surface and the second sealing surface. A plurality of cells is formed on the third surface.

19 Claims, 7 Drawing Sheets

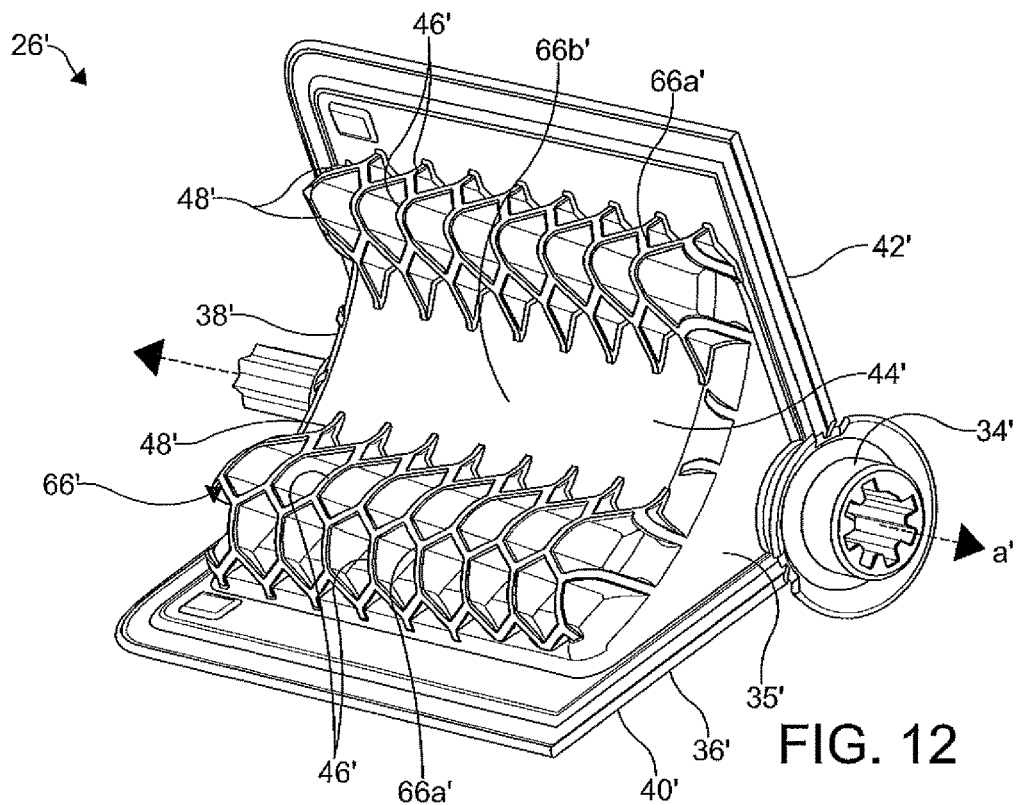
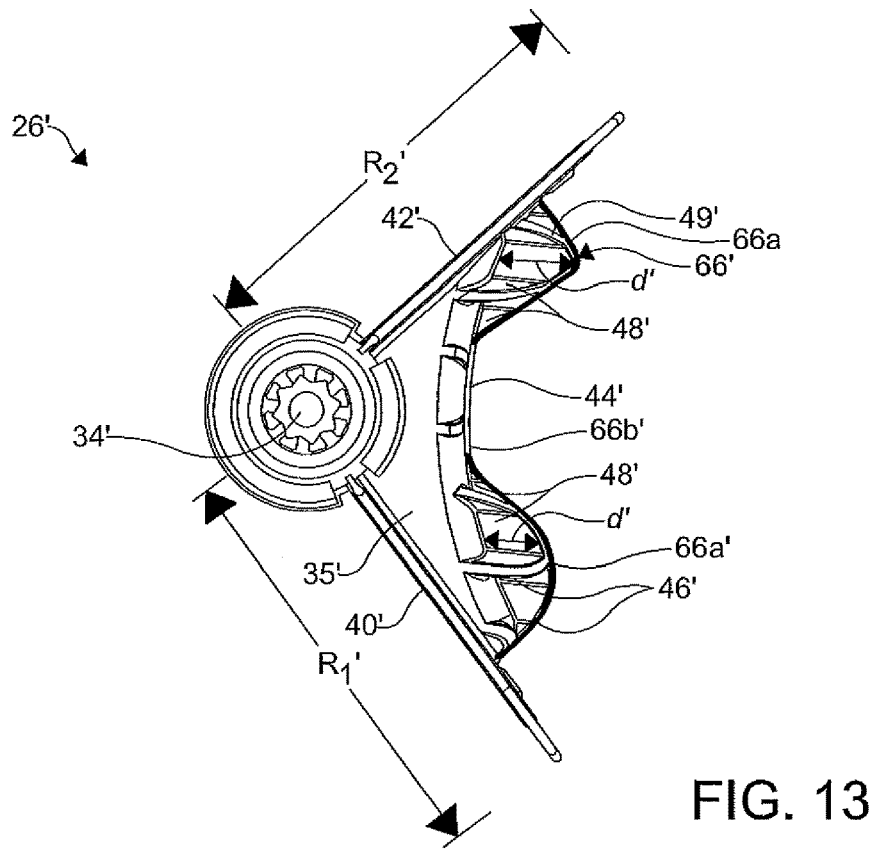
FIG. 12
FIG. 13

TEMPERATURE DOOR FOR HVAC TO FACILITATE BLENDING

FIELD OF THE INVENTION

The invention relates to a heating, ventilating, and air conditioning system for a vehicle and more particularly to a temperature door of a heating, ventilating, and air conditioning system for a vehicle.

BACKGROUND OF THE INVENTION

As is commonly known, vehicles typically include a heating, ventilating, and air conditioning (HVAC) system. The HVAC system maintains a temperature within a passenger compartment of the vehicle at a comfortable level for a passenger by providing a desired heating, cooling, and ventilation to the passenger compartment. The HVAC system conditions air flowing therethrough and distributes the conditioned air throughout the passenger compartment.

HVAC systems include features that control air flow volume, air temperature, and air flow paths, for example. Performance of the HVAC system may be designed to comply with particular targets including temperature linearity, wherein linearity is a predictable rate of change in temperature. For all operating states, it can be desirable to manipulate hot air streams and cold air streams to produce proper temperatures and the predictable rate of change in the temperature.

In an attempt to achieve desired linearity targets, HVAC systems may include features including baffles, conduits, mixing plates, and/or doors to facilitate mixing or blending of the hot air streams with the cold air streams. The addition of these features and/or components can reduce airflow, degrade flow efficiency, increase noise, and increase the cost and weight of the HVAC system.

For example, U.S. Pat. Nos. 6,231,437 and 7,575,511, the disclosures of which are hereby incorporated herein by reference in their entirety, disclose temperature doors that cooperate with walls within an HVAC system adjacent the temperature door to form a small constant gap or a variable gap to permit the blending of the hot air stream with the cold air stream. While the temperature doors can be an effective way to permit an amount of airflow volume to flow past the temperature door for blending, the temperature door can be susceptible to undesired noise, vibration, and harshness (NVH) (e.g., scraping, squeaking, hooting, whistling, etc.) and airflow volume distribution control.

It would therefore be desirable to provide a temperature door for an HVAC system, wherein a temperature linearity, a flow efficiency, an NVH, and an airflow volume distribution control of the HVAC system are optimized and a cost and a weight of the HVAC system are minimized.

SUMMARY OF THE INVENTION

In accordance and attuned with the present invention, a temperature door for an HVAC system, wherein a temperature linearity, a flow efficiency, an NVH, and an airflow volume distribution control of the HVAC system are optimized and a cost and a weight of the HVAC system are minimized, has surprisingly been discovered.

According to an embodiment of the disclosure, a temperature door for an air handling system of a heating, ventilating, and air conditioning system for a vehicle is disclosed. The temperature door includes a first sealing surface and a second sealing surface spaced apart from the first sealing surface. A third surface extends between the first sealing surface and the second sealing surface. A plurality of cells is formed on the third surface.

According to another embodiment of the invention, an air handling system of a heating, ventilating, and air conditioning system for a vehicle is disclosed. The air handling system includes a housing. The housing includes an inlet section in communication with a source of air, a delivery section in communication with a passenger compartment of the vehicle, a first flow path formed therein, and a second flow path formed therein. A temperature door is pivotally mounted in the housing. The temperature door includes a first sealing surface, a second sealing surface spaced apart from the first sealing surface, a third surface extending between the first sealing surface and the second sealing surface, and a plurality of cells formed on the third surface. The temperature door is variably cooperating with the housing t form a third flow path, the plurality of cells cooperate with the third surface to control a flow of air through the third flow path.

According to yet another embodiment of the invention, an air handling system of a heating, ventilating, and air conditioning system for a vehicle is disclosed. The air handling system includes a housing. The housing includes an inlet section in communication with a source of air and a delivery section in communication with a passenger compartment of the vehicle. A first flow path is formed in the housing. A second flow path is formed in the housing. A temperature door is pivotally mounted in the housing. The temperature door includes a first sealing surface, a second sealing surface spaced apart from the first sealing surface, a third surface extending between the first sealing surface and the second sealing surface, and a plurality of hollow cells formed in the third surface. The plurality of hollow cells cooperating with each other to define a contoured surface. The contoured surface cooperating with a portion of the housing to form a third flow path providing communication between the first flow path and the second flow path. The temperature door is variably positionable between a cold air position, a hot air position, and an intermediate position. The cold air position permits a flow of air through the first flow path, the hot air position permits the flow of air through the second flow path, the intermediate position permits the flow of air through the first flow path, the second flow path, and the third flow path.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawing which:

FIG. 12 is a front perspective view of a temperature door according to another embodiment of the present disclosure; and FIG. 13 is a left side elevational view of the temperature door of FIG. 12.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
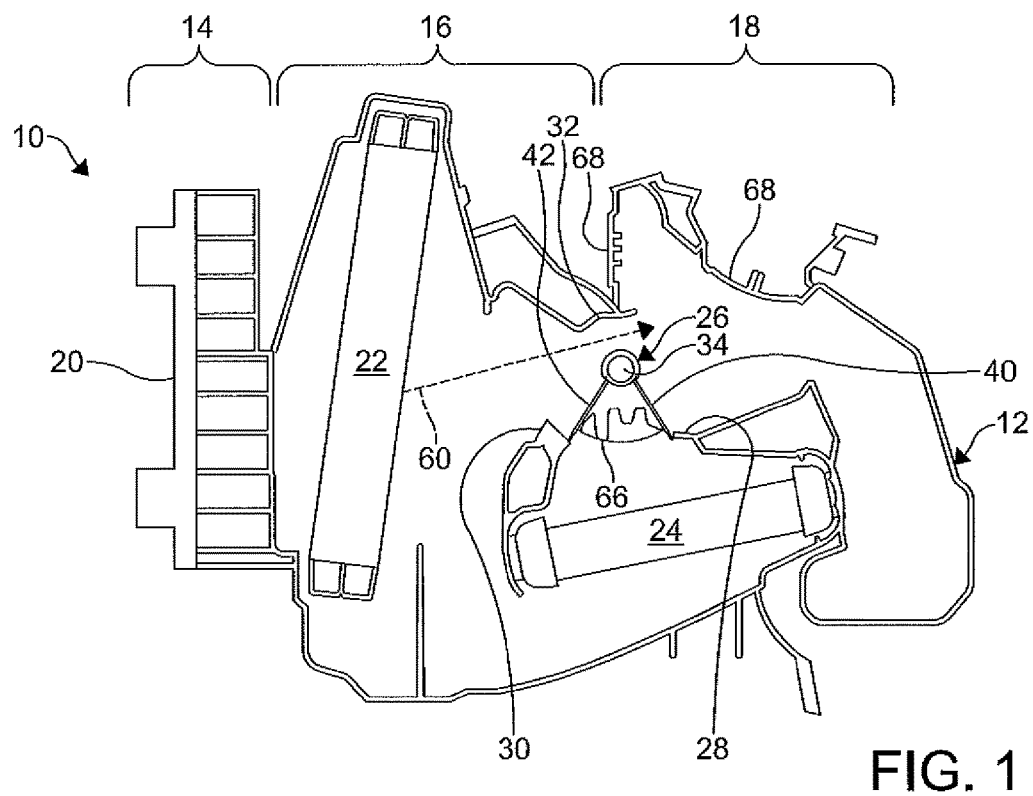
FIG. 1 is a cross-sectional right side elevational view of an air handling system of a heating, ventilating, and air conditioning system for a vehicle according to an embodiment of the invention, wherein a temperature door is positioned in a cold air position.
Figure 2:
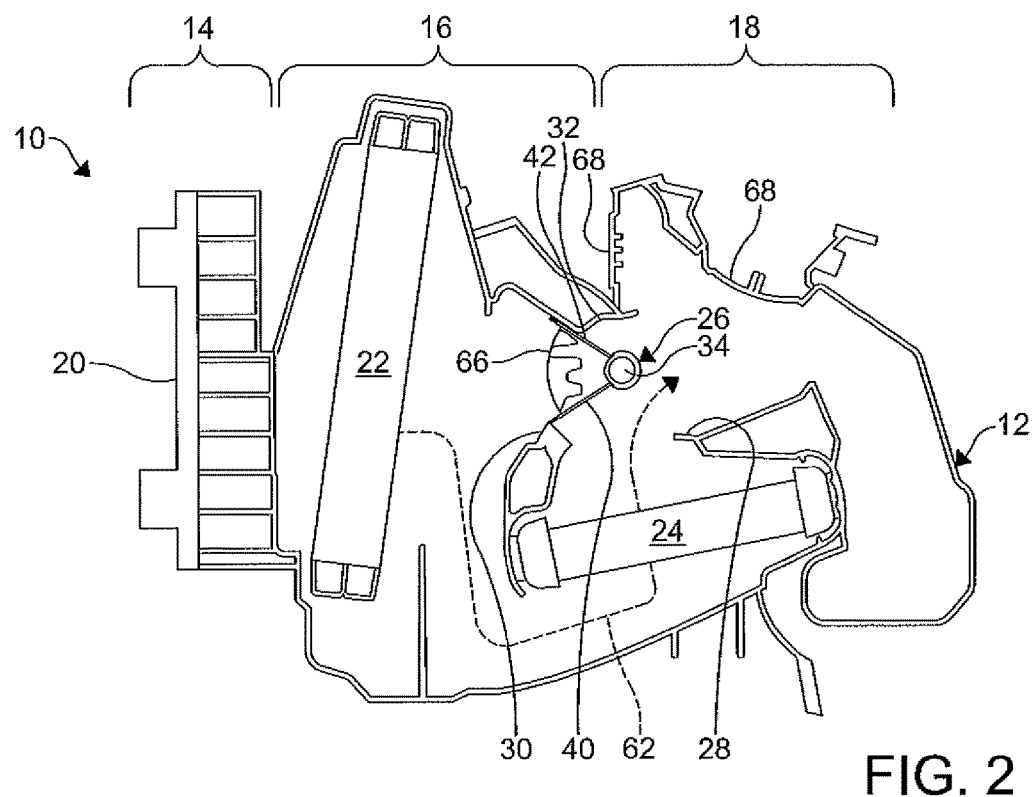
FIG. 2 is a cross-sectional right side elevational view of the air handling system of FIG. 1, wherein the temperature door is positioned in an hot air position.
Figure 3:
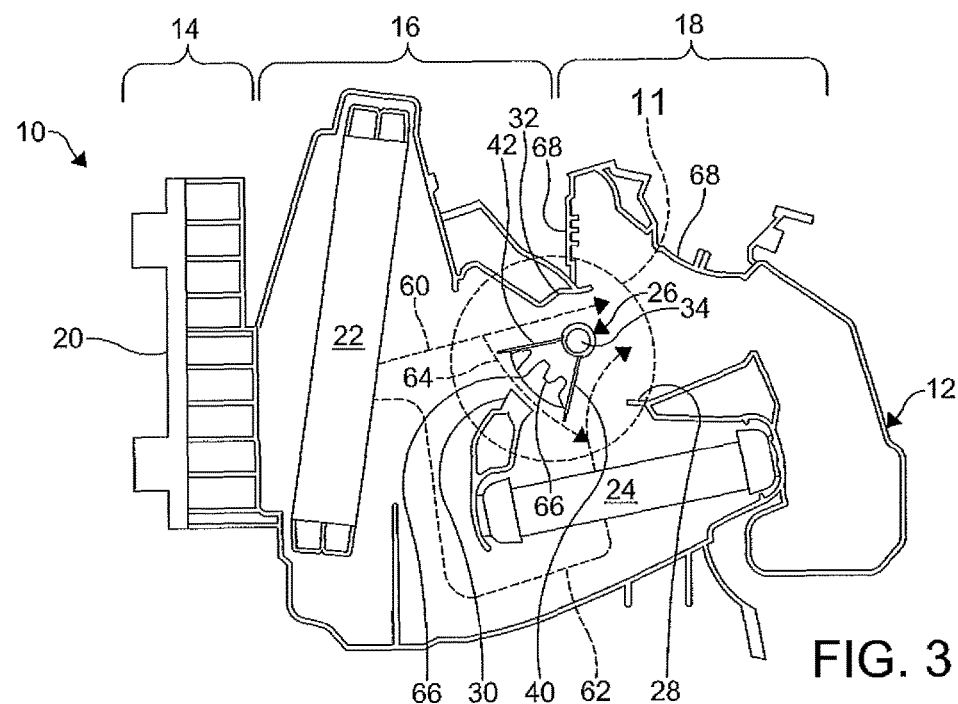
FIG. 3 is a cross-sectional right side elevational view of the air handling system of FIG. 1, wherein the temperature door is positioned in an intermediate air position.

FIGS. 1-3 illustrate an air handling system 10 of a heating, ventilating, and air conditioning (HVAC) system or climate control system according to an embodiment of the disclosure. As used herein, the term air can refer to a fluid in a gaseous state, a fluid in a liquid state, or any combination thereof. The air handling system 10 typically provides heating, ventilation, and air conditioning for a passenger compartment (not shown) of the vehicle. The air handling system 10 is adapted to be installed between sheet metal (not shown) and an interior trim panel (not shown) of the vehicle. It is understood that the air handling system 10 can be installed in other locations in the vehicle as desired, such as under an instrument panel, to a dash panel, in a trunk, in a console, under a floor, in a headliner, or in an engine compartment, for example.

The air handling system 10 includes a hollow main housing 12. The housing 12 includes an inlet section 14, a mixing and conditioning section 16, and a delivery section 18. An air inlet 20 is formed in the inlet section 14 and is in fluid communication with a supply of air. The supply of air can be provided from outside of the vehicle, recirculated from the passenger compartment of the vehicle, or a mixture of the two, for example. The mixing and conditioning section 16 includes an evaporator core 22, a heater core 24, and a temperature door 26 disposed therein. The evaporator core 22 and the heater core 24 are in communication with a source of cooled fluid (not shown) and a source of heated fluid (not shown) respectively.

The mixing and conditioning section 16 includes a first housing wall 28, a second housing wall 30, and a third housing wall 32. It is understood that the housing walls 28, 30, 32 can be formed integrally with other structure of the mixing and conditioning section 16, or can be formed separately and mounted in the mixing and conditioning section 16. It is further understood the housing walls 28, 30, 32 can be portions of inner housings or inner components contained within the housing 12 or outer housings or outer components disposed outside of the main housing 12.

Figure 4:
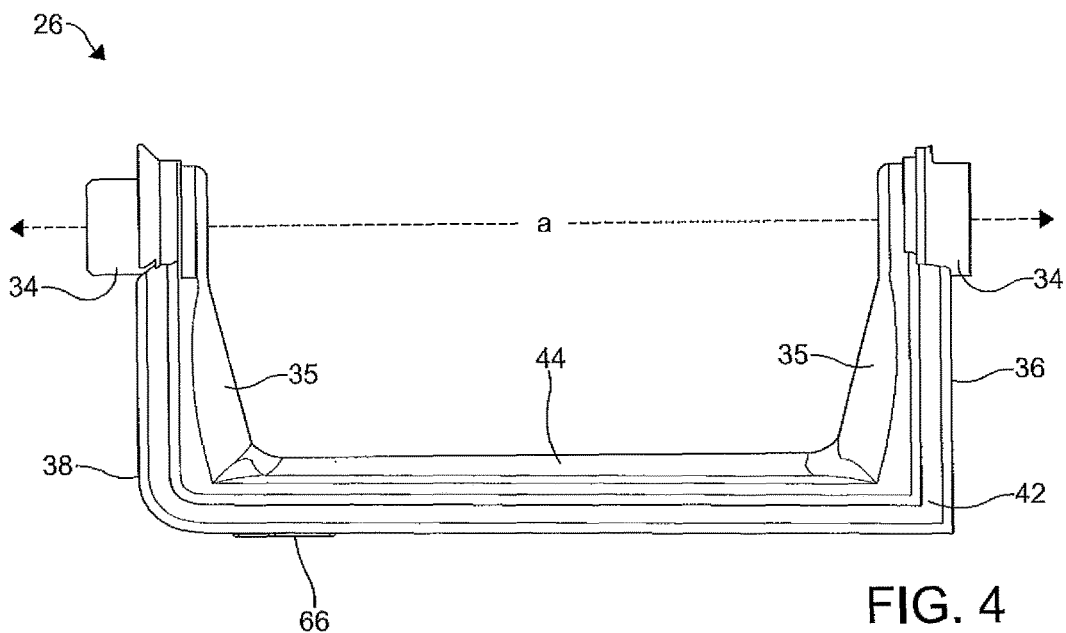
FIG. 4 is a top plan view of the temperature door of FIG. 2.
Figure 5:
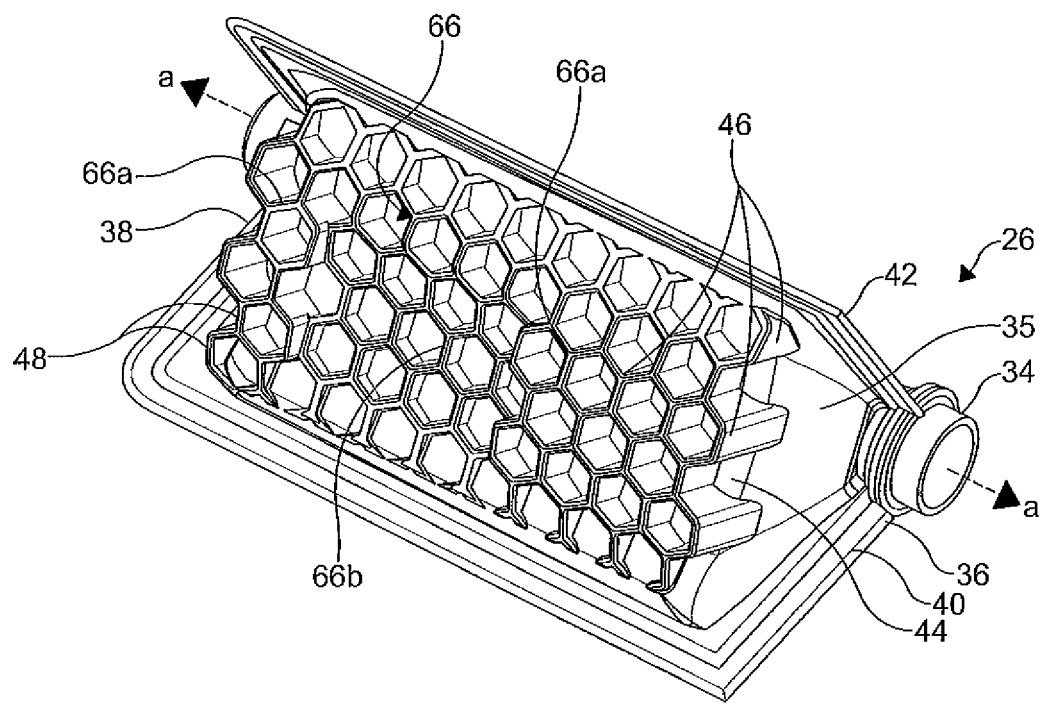
FIG. 5 is a front perspective view of the temperature door of FIG. 4
Figure 6:
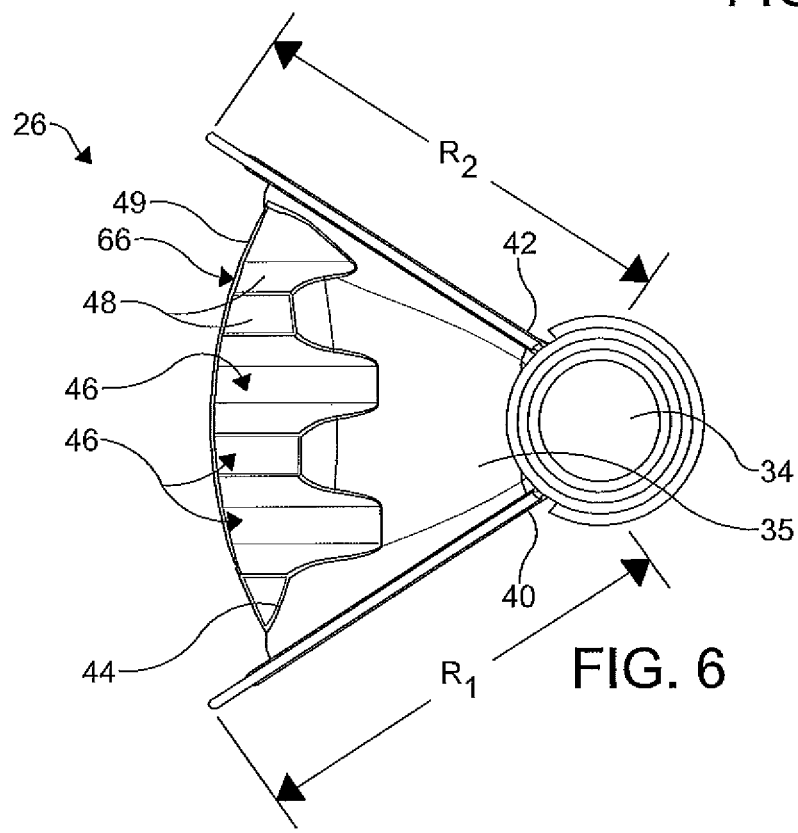
FIG. 6 is a right side elevational view of the temperature door of FIGS. 4-5.
Figure 7:
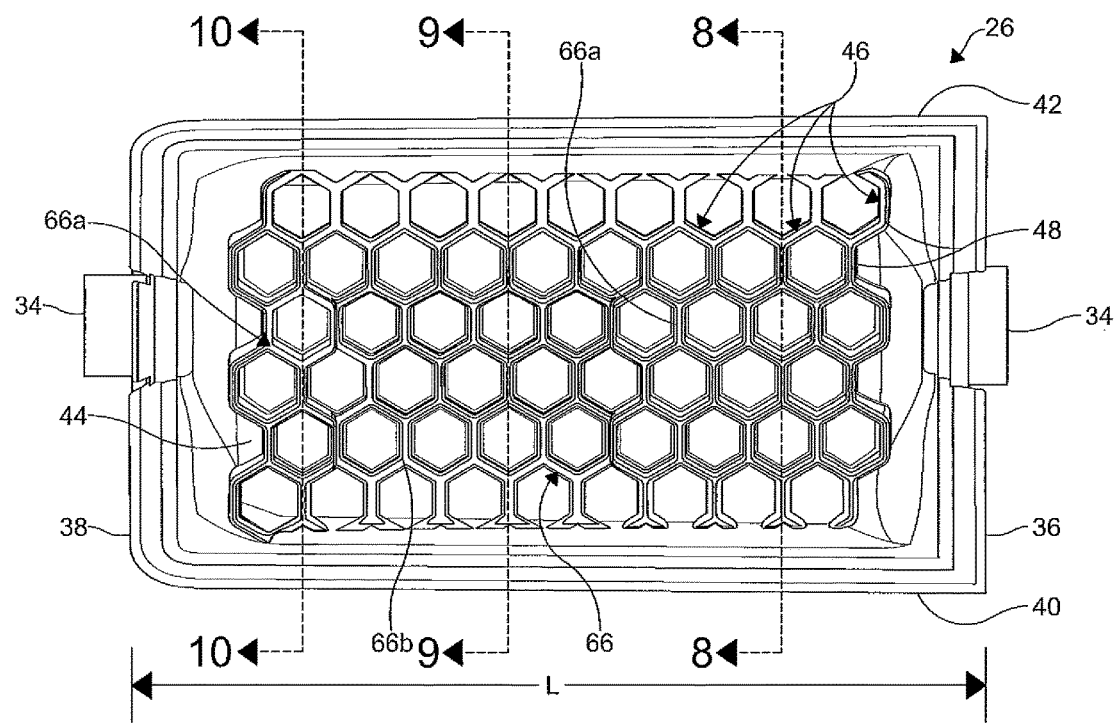
FIG. 7 is a front elevational view of the temperature door of FIGS. 4-6.

The temperature door 26 is disposed on a pair of pivots 34 axially aligned with respect to an axis a shown in FIG. 4. The pivots 34 are pivotally disposed in the housing 12 and configured to be coupled to coupling features (not shown) in the housing 12. The pivots 34 permit the temperature door 26 to pivot between a cold air position as shown in FIG. 1, a hot air position as shown in FIG. 2, and an intermediate air position intermediate the cold air position and the hot air position as shown in FIG. 3. In the embodiment illustrated, the temperature door is configured as one segment, wherein the entire temperature door 26 pivots unitarily. However, it is understood the temperature door 26 can configured into multiple segments such as two, three, four, or any other number of segments, wherein the segments pivot separately. In this scenario, more than two pivots 34 may be employed.

As shown in FIGS. 4-7, a first one of the pivots 34 extends outwardly beyond a first end 36 of the temperature door 26 and a second one of the pivots 34 extends outwardly beyond a second end 38 of the temperature door 26. It is understood the pivots 34 can be flush with or recessed with respect to the ends 36, 38 of the temperature door 26. At least one of the pivots 34 is adapted to be connected to an actuator mechanism (not shown) such as an electrical positioning motor, for example, for controlling a pivotal position of the temperature door 26. It is understood that the actuator mechanism can be electrically operated, mechanically operated, or fluid operated, for example. However, it is understood, the pivots 34 can be configured to receive a shaft that extends intermediate the pivots 34 and received in or through the pivots 34. In this case, the shaft may be coupled to the actuator mechanism. Each of the pivots 34 is provided with a respective flange 35 extending radially outwardly therefrom.

In the embodiment shown, the temperature door 26 is configured as a bent "butterfly" or "barrel/swing" type door. It is understood that other shapes and types of temperature doors can be used as desired. The temperature door 26 is substantially V-shaped in cross-section. A first leg of the V is formed by a first sealing surface 40 having a surface radius R1. A second leg of the V is formed by a second sealing surface 42 having a surface radius R2. In the embodiment illustrated, the surface radius R1 of the first sealing surface 40 is substantially equal to the surface radius R2 of the second sealing surface 42. However, it is understood the surface radius R1 of the first sealing surface 40 can be greater than or less than the surface radius R2 of the second sealing surface 42, if desired. A plane including the first sealing surface 40 and a plane including the second sealing surface 42 intersect at the pivots formed about axis a. In the embodiment illustrated, the first sealing surface 40 and the second sealing surface 42 are disposed at an angle less than 90 degrees with respect to one another. However, the first sealing surface 40 and the second sealing surface 42 can be disposed at other angles with respect to one another, as desired, such as substantially 90 degrees or greater than 90 degrees. Each of the flanges 35 is disposed intermediate the sealing surfaces 40, 42. Each of the sealing surfaces 40, 42 is substantially U-shaped in cross-section (as more clearly shown in FIG. 4). However, the sealing surfaces 40, 42 can be rectangular, trapezoidal, or any other shape as desired.

A third surface 44 extends from the first sealing surface 40 to the second sealing surface 42 at a predetermined distance from the axis a. The third surface 44 extends intermediate the flanges 35 of the temperature door 26 a predetermined distance from the first end 36 of the temperature door 26 to a predetermined distance from the second end 38 of the temperature door 26. In the embodiment illustrated, the third surface 44 has a constant radius from the first sealing surface 40 to the second sealing surface 42. In yet other embodiments, the radius of the third surface 44 can change as a function of its radial location between the first sealing surface 40 and the second sealing surface 42, as desired. It is also understood that the radius of the third surface 44 can change as a function of its axial location between the first end 36 and the second end 38 at any radial position between the first sealing surface 40 and the second sealing surface 42.

A plurality of hollow columnar cells 46 is formed on the third surface 44 of the temperature door 26. The cells 46 extend outwardly from the third surface 44. However, it is understood the cells 46 can extend inwardly into the third surface 44. The cells 46 are arranged in a plurality of parallel rows 48. In the embodiment illustrated, the temperature door 26 has six rows 48 each containing nine cells 46. However, the temperature door 26 can have one, two, three, four, five, seven, eight, or any other number of rows 48 of cells 46 as desired. It is also understood each of the rows 48 can have fewer than nine cells 46 or more than nine cells 46, if desired. Furthermore, the rows 48 can have a varying number of cells 46 with respect to each other. The number of rows 48 formed on the third surface 44 and the number of cells 46 within the rows 48 depends on the application and structure of the housing 12 of the air handling system 10.

The cells 46 of alternating ones of the rows 48 are aligned with each other but offset from the cells 46 of adjacent ones of the rows 48. However, it is understood each of the rows 48 of cells 46 can be aligned with each other, non-parallel with each other, or positioned in any configuration contemplated. The cells 46 can also be formed on the third surface 44 in a randomized non-aligning pattern.

The rows 48 are monolithically formed with adjacent ones of the rows 48. However, one or more of the rows 48 can be separately formed and in contact with other ones of the rows 48 or separately formed and spaced apart from the other ones of the rows 48. In certain embodiments, the cells 46 are monolithically formed with the third surface 44. However, the cells 46 can be separately formed from and attached to the third surface 44, if desired.

In the exemplary embodiment illustrated, each of the cells 46 has a substantially hexagonal cross-sectional shape to facilitate a minimization of noise, vibration, and harshness (NVH) resulting from air flowing adjacent the temperature door 26. Each of the sides of the substantially hexagonal cells 46 forms one of the sides of an adjacent one of the cells 46 forming a substantially "honeycomb" configuration. However, it is understood the cells 46 can have any cross-sectional shape and can form any configuration as desired. For example, the cells 46 can have a substantially circular or substantially ovular cross-sectional shape. In other examples, the cells 46 can also have a substantially triangular cross-sectional shape, a substantially rectangular cross-sectional shape, a substantially octagonal cross-sectional shape, or other cross-sectional shape as desired. Additionally, it is understood the cells 46 can have varying cross-sectional shapes. For example, one or more of the cells 46 can have a circular cross-sectional shape while the other ones of the cells 46 can have a hexagonal cross-sectional shape. The term "substantially" used in conjunction with the above-mentioned cross-sectional shapes means mostly, but not perfectly, one of the above-mentioned cross-sectional shapes. Furthermore, by the term "substantially" used in conjunction with the above-mentioned cross-sectional shapes, the cells 46 can be configured as semi-cells or partial cells, wherein the cells 46 have an unclosed polygonal cross-sectional shape, an unclosed circular cross-sectional shape, or an unclosed ovular cross-sectional shape, for example.

Figure 8:
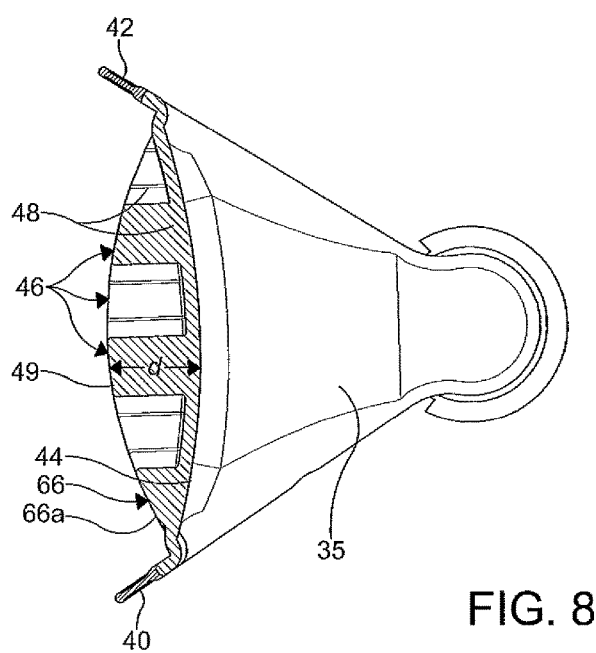
FIG. 8 is a cross-sectional elevational view of the temperature door of FIG. 7 taken along the line 8-8.
Figure 9:
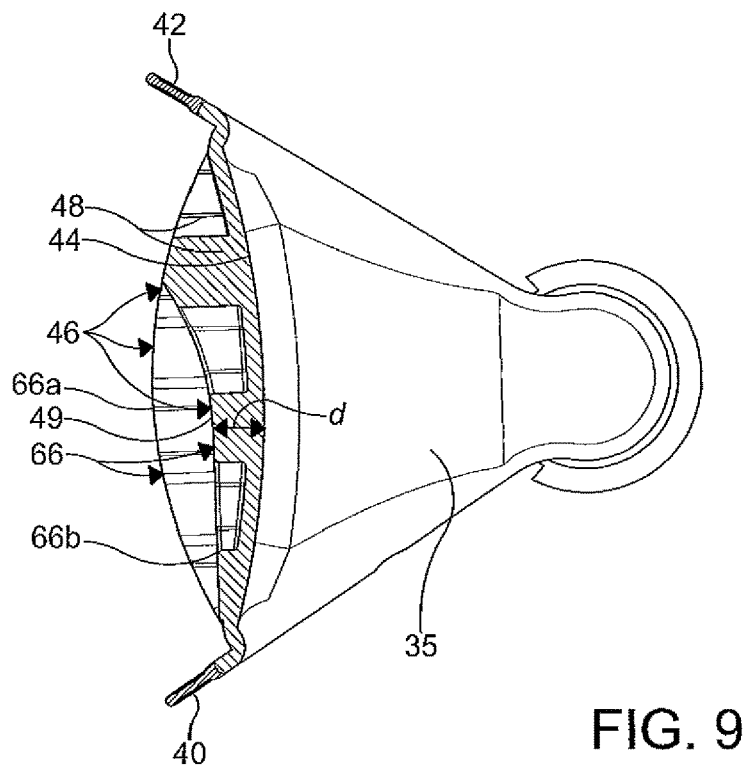
FIG. 9 is a cross-sectional elevational view of the temperature door of FIG. 7 taken along the line 9-9.
Figure 10:
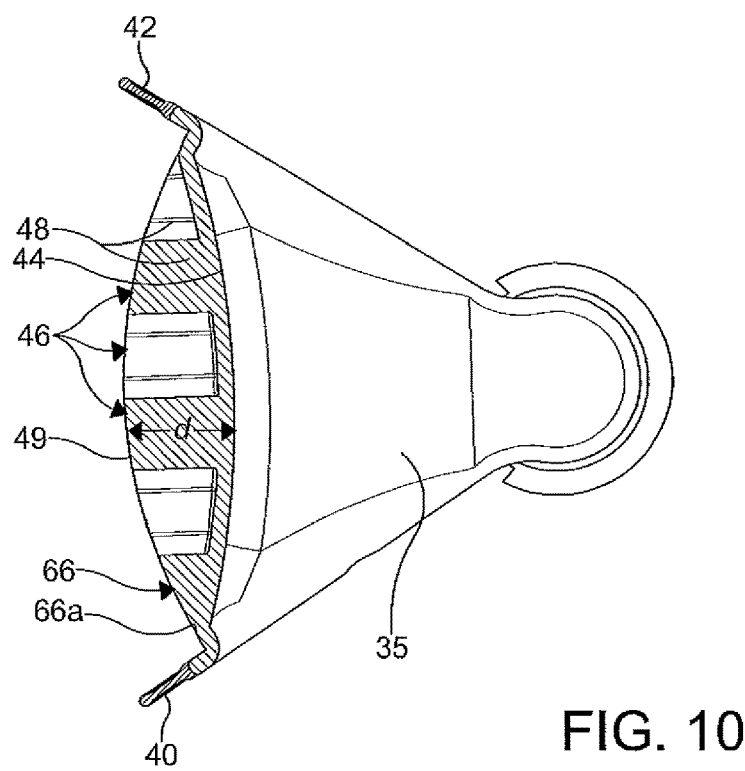
FIG. 10 is a cross-sectional elevational view of the temperature door of FIG. 7 taken along the line 10-10.
Figure 11:
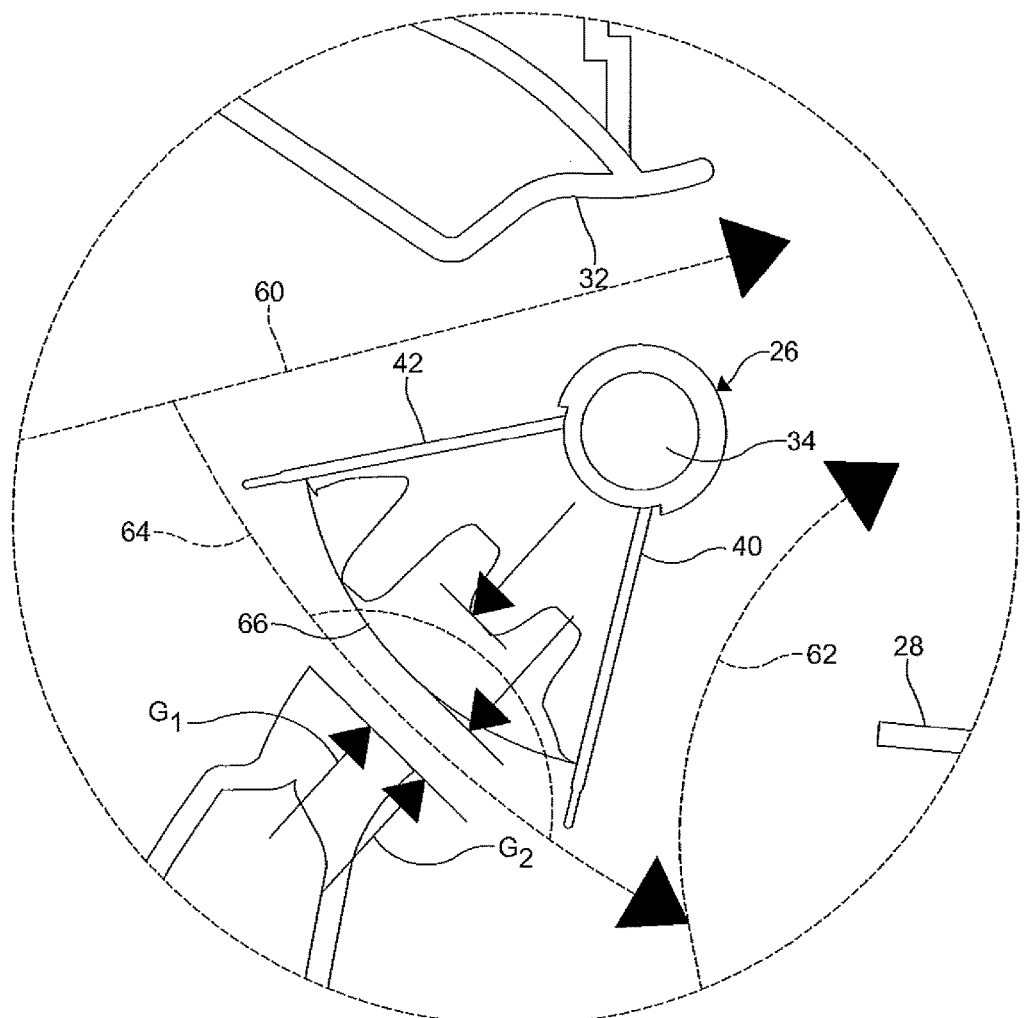
FIG. 11 is an enlarged fragmentary cross-sectional elevational view of the air handling system highlighted by circle 11 in FIG. 3, showing gaps formed by the temperature door and a housing of the air handling system.

Each of the cells 46 has a depth d. The depth d of the cells 46 can vary from each other. The cells 46 having varying depths d cooperate with each other and the third surface 44 to define a contoured surface 66 having peak portions 66a and depression portions 66b. As illustrated in the exemplary embodiment, the depth d of each of the cells 46 can vary between the rows 48 and within each of the rows 48 to effect the peak portions 66a and depression portions 66b of the contoured surface 66. FIGS. 8-10 show cross-sectional views of the temperature door 26 taken through separate regions of the contoured surface 66, to illustrate the varying depths d of the cells 46 to effect the peak portions 66a and the depression portions 66b. In a first region (FIG. 8) adjacent the first end 36 of the temperature door 26 and a third region (FIG. 10) adjacent the second end 38 of the temperature door 26, the depth d of the cells 46 gradually decreases from the centermost rows 48, laterally outwardly, to the outermost rows 48. The cells 46 in the first region and the third region cooperate to form portions of the contoured surface 66 having a substantially convex cross-sectional contour with respect to the axis a. In a second region (FIG. 9), the depth d of the cells 46 gradually decreases in a portion of the rows 48 forming the depression portions 66b of the contoured surface 66 having a substantially concave cross-sectional contour.

In certain embodiments, an open end 49 of a number of the cells 46 tapers towards the first sealing surface 40, the second sealing surface 42, the first end 36 of the temperature door 26, the second end 38 of the temperature door 26, and/or towards any of the adjacent ones of the cells 46. The tapers accommodate for the varying depths d of the cells 46 and facilitate a continuous transition between the open ends 49 of cells 46 of varying depths d.

The configuration of the cells 46 in FIGS. 4-10 forming the contoured surface 66 are exemplary embodiments. It is understood that other configurations of the cells 46 can be contemplated depending on the application of the air handling system 10. The cells 46 can have any depths, tapers, shapes, and arrangements as desired to effect a desired contour of the contoured surface 66. The contoured surface 66 formed by the cells 46 can be entirely substantially planer, entirely concave, or entirely convex. The contoured surface 66 can include any number of peak portions 66a and depression portions 66b of varying depths and heights as desired. The peak portions 66a and depression portions 66b can be planar, concave, convex, crenate, crenellated or a combination thereof.

As shown in FIGS. 1-3, and 11, the temperature door 26 is selectably and variably positionable between the cold air position, the hot air position, and the intermediate air position. In FIG. 1, the first sealing surface 40 sealingly engages the first housing wall 28 and the second sealing surface 42 sealingly engages the second housing wall 30, when the temperature door 26 is in the cold air position. In FIG. 2, the first sealing surface 40 sealingly engages the second housing wall 30 and the second sealing surface 42 sealingly engages the third housing wall 32, when the temperature door 26 is in the hot air position. As shown in FIG. 3, when the temperature door 26 is in the intermediate air position, the first sealing surface 40 is positioned between the first housing wall 28 and the second housing wall 30 and the second sealing surface 42 is positioned between the second housing wall 30 and the third housing wall 32. As further shown in FIG. 11, in the intermediate air position, gaps G1, G2 are formed between the contoured surface 66 of the temperature door 26 and the second housing wall 30. The gaps G1, G2 vary depending on the pivotal position of the temperature door 26, the contour of the contoured surface 66, and the configuration of the housing 12. For example, the gap G1 formed by the second housing wall 30 and the contoured surface 66 at the depression portion 66b is different from the gap G2 formed a by the second housing wall 30 and the contoured surface 66 at the peak portion 66a. The gaps G1, G2 can increase and decrease as the temperature door 26 pivots.

A first flow path 60 is formed in the mixing and conditioning section 16 from the evaporator core 22 to the delivery section 18. A second flow path 62 is formed in the mixing and conditioning section 16 from the evaporator core 22 through the heater core 24 to the delivery section 18. A third flow path 64 is formed in the mixing and conditioning section 16 from the evaporator core 22 through the gap G1, G2 to the delivery section 18. The third flow path 64 provides fluid communication between the first flow path 60 and the second flow path 62 downstream of the heater core 24.

As the air flows through the third flow path 64, the contoured surface 66 formed by the cells 46 facilitates controlling an amount of the air flowing through the third flow path 64 as the temperature door 26 alternates between the cold air position and the hot air position. The peak portions 66a of the contoured surface 66 formed by the cells 46 cooperate with the second housing wall 30 to eliminate or minimize the gap G1, G2. In turn, an elimination of or minimization of the gaps G1, G2 militates against or minimizes the amount of the air flowing through the third flow path 64. In the reverse, the depression portions 66b of the contoured surface 66 formed by the cells 46 cooperate with the second housing wall 30 to increase the gaps G1, G2. In turn, the increase in the gaps G1, G2 facilitates an increase in the amount of air flowing through the third flow path 64. In the intermediate air position of the temperature door 26, the amount of the air flowing through the third flow path 64 depends on the pivotal position of the temperature door 26 between the cold position and the hot position and the contour of the contoured surface 66 cooperating with the second housing wall 30 at that pivotal position. As the air flows through the third flow path 64, the air flows over the contoured surface 66. The air flowing through the third path 64 blends with the air flowing through the second path 62 to effect a change in temperature of the air flowing through the second path 62. The contoured surface 66 facilitates blending of the air flowing through the first flow path with the air flowing through the second flow path. The cells 46 facilitate a minimization of NVH.

The delivery section 18 includes outlets 68 for supplying conditioned air from the first flow path 60, the second flow path 62, and/or the third flow path 64 to the passenger compartment of the vehicle. Additional outlets 68 can be included in the delivery section 18 if desired.

As illustrated in FIGS. 12-13, a temperature door 26' configured for an air handling system (not shown) according to another exemplary embodiment of the invention is illustrated. Features similar to the temperature door 26 illustrated in FIGS. 1-11 are denoted with the same reference numeral and a prime (') symbol for clarity. The temperature door 26' of FIGS. 12-13 is similar to the temperature door 26 of FIGS. 1-11 described hereinabove, except the cells 46' have an alternate configuration.

As illustrated, the cells 46' are arranged in seven rows 48'. The cells 46' are a combination of cells having either substantially hexagonal cross-sectional shapes or are configured as semi-cells or partial cells having nonclosed hexagonal cross-sectional shapes. Also, as indicted hereinabove with reference to the temperature door 26 of FIGS. 1-11, the cells 46' can have any cross-sectional shape as desired. Three of the rows 48' are spaced apart from four other ones of the rows 48' exposing a portion of the third surface 44' therebetween. The portion of the third surface 44' cooperates with the cells 46' to form the contoured surface 66'. The contoured surface 66' includes one depression portion 66b' intermediate two peak portions 66a'. The depression portion 66b' and the peak portions 66a' of the contoured surface 66' extend along the length of the temperature door 26'.

As shown in FIG. 13, a first one of the peak portions 66a' has a substantially triangular cross-sectional shape and a second one of the peak portions 66a' has a substantially arcuate cross-sectional shape. As stated hereinabove regarding the temperature door 26 of FIGS. 1-11, the cells 46' of the temperature door 26' of FIGS. 12-13 can have any configuration as desired to form any number of peak portions 66a' and depression portions 66b' as desired depending on the requirements of the air handling system.

The temperature doors 26, 26' described above achieve desired levels of temperature linearity, flow efficiency, and NVH within the air handling system 10. The cells 46, 46' can be adapted to effect, any surface contour configuration as desired including any number of depression portions 66b, 66b' and peak portions 66a, 66a' to correspond to varying housing configurations and parameters of varying air handling systems. The temperature doors 26, 26' facilitate blending cold air steams and hot air steams. The cells 46, 46' facilitate a reduction of resonance frequencies which, in turn, minimize undesirable NVH resulting from the air handling system 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A temperature door for an air handling system of a heating, ventilating, and air conditioning system for a vehicle comprising:
   a first sealing surface disposed on a first plane;
   a second sealing surface disposed on a second plane, the first plane angularly displaced from the second plane with respect to an axis of rotation of the temperature door to form a substantially V-shaped arrangement between the first sealing surface and the second sealing surface when viewed along the axis of rotation of the temperature door;
   a third surface extending between the first sealing surface and the second sealing surface; and
   a plurality of cells formed on the third surface, wherein the first sealing surface has a surface radius different from a surface radius of the second sealing surface.

2. The temperature door of claim 1, wherein the temperature door is variably positionable between a first position and a second position.

3. The temperature door of claim 1, wherein each of the cells is hollow.

4. The temperature door of claim 1, wherein at least one of the cells has one of a substantially polygonal cross-sectional shape, a substantially circular cross-sectional shape, and a substantially ovular cross-sectional shape.

5. The temperature door of claim 1, wherein at least one of the plurality of cells has a substantially hexagonal cross-sectional shape.

6. The temperature door of claim 1, wherein the plurality of cells forms a honeycomb configuration.

7. The temperature door of claim 1, wherein each of the plurality of cells has a depth, and wherein a depth of a first one of the plurality of cells has a depth different from a depth of a second one of the plurality of cells.

8. The temperature door of claim 1, wherein at least one of the plurality of cells is tapered.

9. The temperature door of claim 1, wherein the plurality of cells and the third surface cooperate to form a surface having a contour with a depression portion.

10. The temperature door of claim 1, wherein the plurality of cells is arranged in a plurality of rows.

11. An air handling system of a heating, ventilating, and air conditioning system for a vehicle comprising:
a housing including a first housing wall, a second housing wall, a third housing wall, an inlet section in communication with a source of air, a delivery section in communication with a passenger compartment of the vehicle, a first flow path formed in the housing, and a second flow path formed in the housing; and
a temperature door pivotally mounted in the housing, the temperature door including a first sealing surface, a second sealing surface spaced apart from the first sealing surface, a third surface extending between the first sealing surface and the second sealing surface, and a plurality of cells formed on the third surface, the temperature door cooperating with the housing to form a third flow path, the plurality of cells cooperating with the third surface to control a flow of air through the third flow path;
wherein the first sealing surface sealingly engages the first housing wall and the second sealing surface sealingly engages the second housing wall when the temperature door is in a first position, wherein the first sealing surface sealingly engages the second housing wall and the second sealing surface sealingly engages the third housing wall when the temperature door is in a second position, wherein the first sealing surface is positioned intermediate the first housing wall and the second housing wall when the temperature door is in a third position, and wherein the second sealing surface is positioned intermediate the second housing wall and the third housing wall when the temperature door is in the third position.

12. The air handling system of claim 11, wherein the third flow path provides fluid communication between the first flow path and the second flow path.

13. The air handling system of claim 11, wherein each of the plurality of cells is hollow and has one of a substantially polygonal cross-sectional shape, a substantially circular cross-sectional shape, and a substantially ovular cross-sectional shape.

14. The air handling system of claim 11, wherein each of the plurality of cells has a substantially hexagonal cross-sectional shape.

15. The air handling system of claim 11, wherein the plurality of cells cooperates with the third surface to define a contoured surface, the contoured surface having at least one depression portion.

16. The temperature door of claim 11, wherein the first sealing surface has a surface radius equal to a surface radius of the second sealing surface.

17. An air handling system of a heating, ventilating, and air conditioning system for a vehicle comprising:
a housing including an inlet section in communication with a source of air and a delivery section in communication with a passenger compartment of the vehicle;
a first flow path formed in the housing;
a second flow path formed in the housing; and
a temperature door pivotally mounted in the housing, the temperature door including a first sealing surface, a second sealing surface spaced apart from the first sealing surface, a third surface extending between the first sealing surface and the second sealing surface, and a plurality of hollow cells formed in the third surface, the plurality of hollow cells cooperating with each other to define a contoured surface, the contoured surface cooperating with a portion of the housing to form a third flow path providing communication between the first flow path and the second flow path, the temperature door variably positionable between a cold air position, a hot air position, and an intermediate position, the cold air position permitting a flow of air through the first flow path, the hot air position permitting the flow of air through the second flow path, the intermediate position permitting the flow of air through the first flow path, the second flow path, and the third flow path.

18. The air handling system of claim 17, wherein at least a portion of the cells has one of a substantially polygonal cross-sectional shape, a substantially circular cross-sectional shape, and a substantially ovular cross-sectional shape.

19. The temperature door of claim 17, wherein the first sealing surface has a surface radius equal to a surface radius of the second sealing surface.

* * * * *